June 9, 1942. H. B. STANFORD 2,286,021
DENTAL MATRIX CLAMP
Filed June 28, 1940 2 Sheets-Sheet 1

Inventor:
HORRIE BURTON STANFORD

By
Shrur, Crave & Gordon
Attorneys.

June 9, 1942. H. B. STANFORD 2,286,021
DENTAL MATRIX CLAMP
Filed June 28, 1940 2 Sheets-Sheet 2
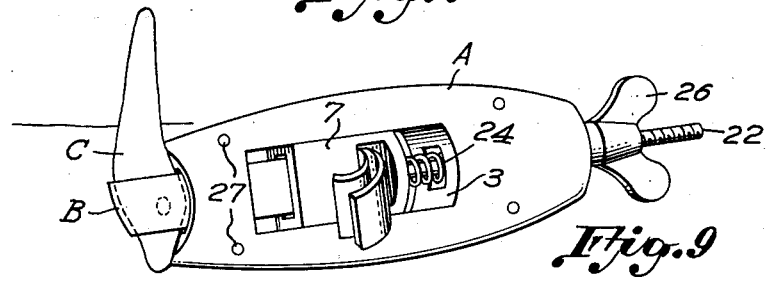
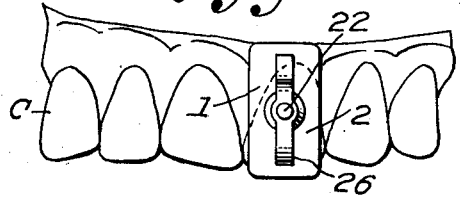
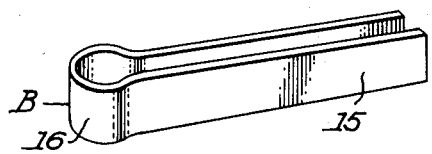
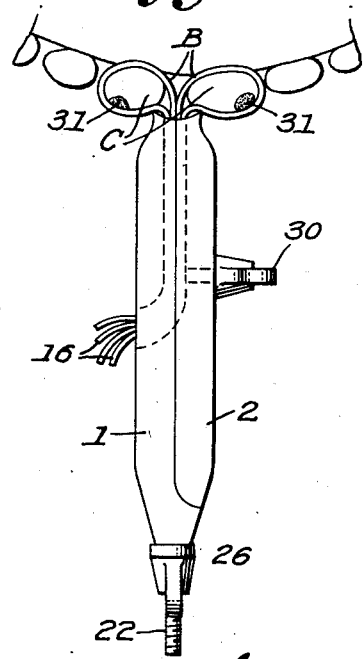
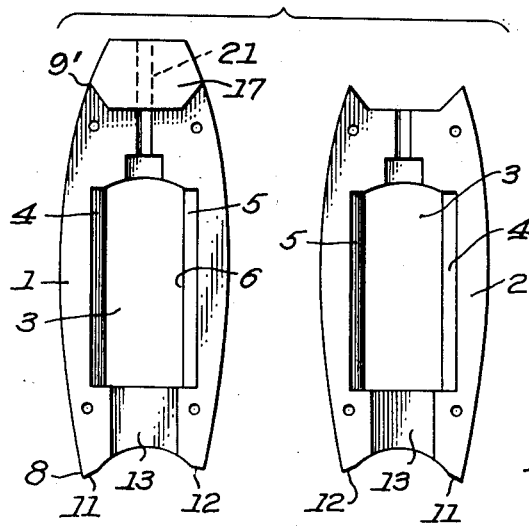
Inventor:
HORRIE BURTON STANFORD
By Shreve, Crow & Gordon,
Attorneys.

Patented June 9, 1942

2,286,021

UNITED STATES PATENT OFFICE 2,286,021

DENTAL MATRIX CLAMP

Horrie Burton Stanford, Atlanta, Ga.

Application June 28, 1940, Serial No. 343,053

9 Claims. (Cl. 32—63)

Generically this invention relates to clamping devices but it is more especially directed to a dental matrix appliance or clamp.

One of the principal objects of this invention is the provision of a dental matrix clamp for supporting and adjusting a flexible band about a tooth in engagement with a porcelain or other plastic cavity filling material tending to render the material dense and exerting an even or uniform pressure thereon during its hardening operation.

Another important object of this invention is the provision of a matrix clamp for clamping a Celluloid or other flexible strip about a tooth, the jaw portions being so designed as to bracingly and bitingly engage the surface of the tooth to prevent slippage of the device during the clamping operation.

Another important object of this invention is the provision of a matrix clamping device of this character having means for securing the ends of a flexible strip about a tooth, additional means for tightening the band and at the same time bracingly securing the device to the tooth being filled and including means for bitingly engaging the surface of the tooth at spaced points to maintain the device rigidly secured and anchored to the tooth without discomfort and without interfering with the opening and closing of the mouth, the formation of the tooth contacting portion being such as to conform to different shaped teeth without necessitating mechanical adjustment of the device for such purpose.

Still another object of the invention is the provision of a clamping device having adjustable means for tightening a flexible band about a tooth to maintain a uniform pressure on the plastic filling material and at the same time hold the clamping jaws in anchored position with respect to the tooth without discomfort to the patient and without interfering with the work on other teeth during the hardening period.

A further object of this invention is the provision of a matrix clamp of the above character adapted to clamp a resilient strip about a tooth for binding engagement with a plastic filling material during its hardening period, the construction of the device being such as to present a substantially block-like non-flexible structure, the curvature of the jaw elements being such as to be adjustable to different shaped teeth by simply reversing the position of the jaws, said device being applicable to a tooth whether there are adjoining teeth or not.

A still further object of this invention is the provision of a device of the above character adapted to bracingly extend at right angles with respect to a tooth or teeth to clamp a flexible band about a single tooth or more than one tooth to compressingly engage a porcelain or other plastic filling material in one or several cavities during the setting or hardening operation without discomfort to the patient, each tooth member having a pair of teeth, the teeth of the respective jaws extending in opposite directions to provide spaced teeth adapted to bitingly engage the surface of a tooth or the surfaces of adjoining teeth where it is desired that the band extend around and engage fillings in more than one tooth, such construction maintaining the device in clamping and bracing engagement with the tooth or teeth against slippage and in a position to permit closing of the mouth as well as operation on other teeth during setting of the material.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 7 is a perspective view showing the device in clamping engagement with a tooth.

Fig. 8 is an end view of the device operatively clamped to a tooth.

Fig. 9 is a view of the flexible strip.

Fig. 10 is a view of the flexible strip shaped for insertion in the device.

Fig. 11 is a view of the complemental plate members in disassembled relation; and Fig. 12 is a diagrammatic view of the device with two flexible strips operatively positioned with respect to two teeth.

Figure 1:
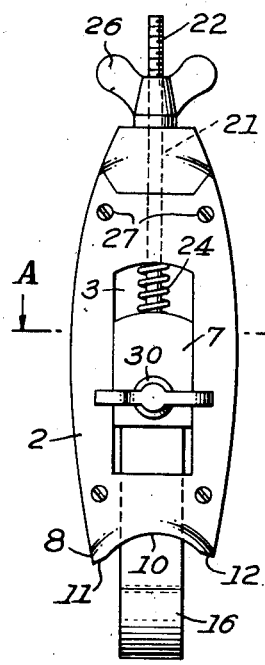
Fig. 1 is a front view of my improved matrix clamp device.
Figure 2:
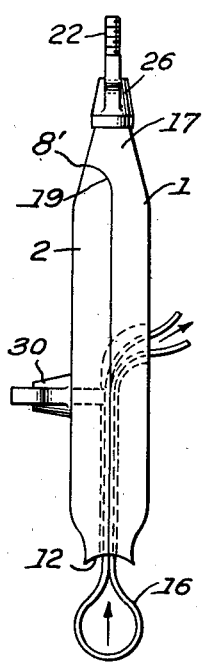
Fig. 2 is an edge view of Fig. 1.
Figure 3:
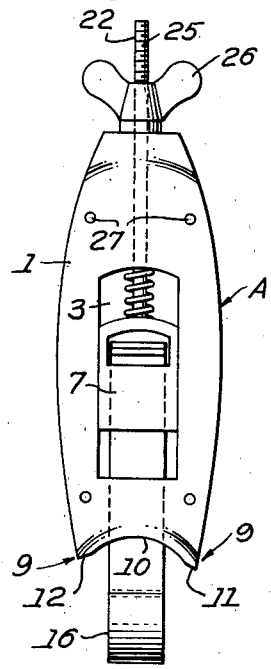
Fig. 3 is a rear view of Fig. 1.
Figure 5:
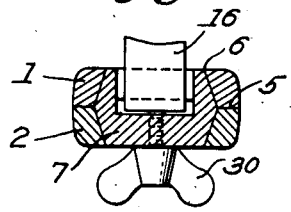
Fig. 5 is a cross section on the line A—A of Fig. 1.
Figure 4:
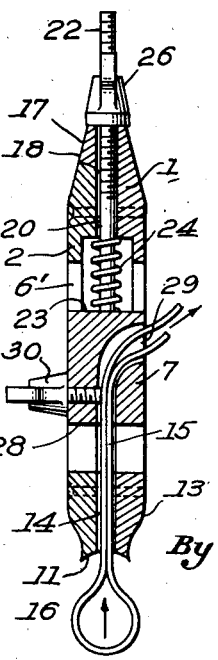
Fig. 4 is a longitudinal section.
Figure 6:
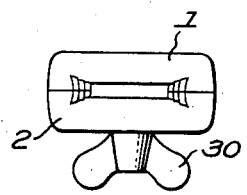
Fig. 6 is an end view.

The devices of this character with which I am familiar have proven deficient in many respects such as presenting a complex construction and more or less resilient tending to give or buckle under clamping stresses; adapted to be braced by or engaged with an adjoining tooth or teeth; not susceptible of being employed in connection with a number of cavities in one operation and by reason of their construction having a tendency to slip during the clamping operation; not permitting freedom in opening and closing the mouth and not permitting work on other teeth while the clamp is in operative position, and it was to overcome such deficiencies by providing a matrix clamp device having a pair of complemental plate members or castings terminating at their ends in jaw structures, said jaws at one edge terminating in respective pairs of tooth-like projections of greater length than the similar projections at the other edge of the jaws with elongated curved edges intermediate the tooth-like projections, a block means carried by said plates, longitudinally slidable, and having means for gripping the ends of a flexible band adapted to clampingly engage a tooth, and means in connection with said block for tightening the band about the tooth and at the same time effecting biting engagement of said projection or prongs with the surface of a tooth or teeth so that the device will be held firmly at right angles thereto against slippage thereby permitting opening and closing of the patient's mouth and permitting other teeth to be worked on during the plastic material hardening operation, that I designed the matrix clamp forming the subject matter of this invention.

In the illustrated embodiment characterizing this invention there is shown a dental matrix clamping device or appliance A, a Celluloid or other flexible tooth encircling matrix strip or band B and a tooth or teeth C.

The matrix clamp A comprises a pair of complemental plate members 1 and 2 substantially rectangular in configuration and formed with an elongated opening 3. The meeting faces of these plates are hollowed out as at 4 surrounding the opening 3 so that they will be wider at their meeting faces as at 5 than at their exposed or outer surfaces as at 6 forming a retaining slideway 6' for the slide block 7 mounted therein when the plates are arranged in superimposed relation as will directly more fully appear.

Plates 1 and 2 are formed at one end with complemental jaws 8 and 9, respectively, both of which terminate in a curved end surface 10, one end of said curved end surface being formed with a biting point or tooth 11 flared slightly outwardly so that the biting points of the respective jaws will be slightly spaced from each other. When the plates are in face to face engagement the other end of said curved faces at the opposite side of said jaws are formed with similar slightly flared teeth 12, the meeting face of each jaw is formed with a complemental groove 13 so as to form an opening 14 through which is adapted to slidably extend the folded or overlapped portions 15 of the band B forming the tooth receiving loop 16, as will hereinafter more fully appear. The rear end 9' of plate 1 opposite to jaw 9 is formed with portion 17 tapering as at 18 towards its extremity and of a thickness substantially equal to that of the combined plates. Plate 2 is of less length than plate 1 and the meeting faces of end portion 17 and the end 8' of said plate are complementally curved as at 19. The meeting faces of plates 1 and 2 at points adjacent the curved end of plate 2 are complementally grooved as at 20 and the end 17 is formed with a bore 21 constituting a continuation of the opening formed by said grooves when plates 1 and 2 are in meeting engagement and which is adapted to receive the rod 22 which is rigidly secured in the end 23 of matrix clamp block 7 when mounted for slidable engagement intermediate the plates 1 and 2 as hereinbefore referred to. Mounted on said rod is a coil spring 24 which seats against block 7 and portion 17, normally urging said block towards said jaws to extend loop 16 with respect to said jaws and in clamp loosening direction with respect to tooth C when in tooth engaging position, as will be well understood. The free end of rod 22 is threaded as at 25, and on which is threadedly engageable wing nut 26, actuation of which in one direction moves block 7 in loop tightening direction and the jaws 8 and 9 in tooth engaging direction, as will directly more fully appear. When the meeting faces of plates 1 and 2 are in engagement said plates are adapted to be rigidly interconnected by screws 27 or other suitable connecting means. It will be noted that when the plates are rigidly connected a substantially solid block-like compact clamping structure is effected and which can not be sprung or distorted by clamping engagement with a tooth or teeth.

The block 7 is formed in one end with a rectangular opening 28 extending in alignment with opening 14 partially through the block and then at an angle outwardly through the side of the block as at 29, the overlapping ends of the looped band B adapted to be threaded through opening 14 and through opening 28, the free ends projecting from said opening as at 29 and threadedly mounted in the side of the block opposite to 29 is a wing headed screw 30 adapted to intersect the slot opening 28 and impinge the flexible overlapped portions of strip or band B against the wall of said opening to firmly secure said looped band to said block as desired, whereupon the device carrying loop 16 is ready to be clampingly applied to a tooth or teeth C, as desired.

Fig. 12 illustrates the device A clampingly securing a flexible strip B about each of two adjoining teeth C in compressing engagement with the plastic material 31 in each of the teeth C, said device operating to simultaneously secure the strips B about the adjoining teeth C in the same manner as employed in connection with a single tooth C except, that in this instance, the prongs or teeth 11 and 12 of one jaw bitingly engage the surface of one tooth and the teeth 11 and 12 of the other jaw similarly engage the surface of the other tooth to supportingly maintain the device in clamping position. Depending upon the location of the cavities one strip B may be employed with the two teeth instead of a separate strip for each tooth, also it will be apparent that the instant jaw and tooth or prong structure permits the device to be employed with respect to one tooth or more than one, and that it may be anchored at different positions with respect to the surface of the tooth as desired.

While the operation of the device would seem to be clear from the above description, it might be well to further state that, when the looped ends of the resilient strip B are threaded through openings 14 and 28 and screw 30 tightened to secure the strip in the slidable block element 7, the spring 24 will tend to impel said block forward in loop loosening direction so that the loop may be easily positioned about a tooth, and actuation of nut 26 draws block 7 rearwardly tightening the loop about the tooth in compressing engagement with the plastic material 31 and drawing the clamping jaws into clamping position with the tooth projections 11 and 12 in biting engagement with the surface of the tooth or teeth, thereby not only exerting uniform pressure on the plastic material during its setting or hardening period but at the same time firmly anchoring the device against displacement and in supported position at right angles to the tooth or teeth, so that the device will not interfere with the opening and closing of the patient's mouth and permit work on other teeth to be proceeded with during the clamping operation. The solid and compact construction of the device enables any desired degree of clamping force to be used without causing distortion to or movement of the device from its desired set position.

From the above it will be apparent that I have designed a matrix clamp or dental appliance of compact form, having a jaw structure reversible to adjustably engage different shaped teeth, having teeth or prong projections adapted to engage the surface of the tooth at points spaced in opposite directions to firmly anchor the device in clamping position, yet one simple in construction and operation, comprising few parts, manufacturable at a reasonable cost and efficient for the purposes intended.

Although in practice I have found that the form of my invention illustrated in the accompanying drawings and referred to in the above description as the preferred embodiment is the most efficient and practical, yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what is desired protected by Letters Patent is as set forth in the following claims:

1. A dental appliance comprising a body including a matrix jaw structure, an element slidable with respect to said body and having a slot extending therethrough, a resilient loop member carried by the slidable element and adapted to embrace a tooth, said loop member having overlapped ends adjustable in said slot irrespective of their length, said jaw structure having an arcuate end surface, the ends of the arc being disposed in vertically spaced planes, means carried by said jaw structure at the ends of said arc for biting engagement with the tooth surface, and means coacting with said element and said body for adjusting said slidable element to draw said loop into binding engagement and said jaw means into biting engagement with said tooth, whereby a uniform binding pressure is maintained on the tooth by said loop and accidental displacement of said jaw structure during the clamping operation is prevented.

2. A dental appliance comprising a body including a jaw structure, an element slidable with respect to said body, a resilient loop member carried by the slidable element and adapted to embrace a tooth, said jaw structure having an arcuate end surface, one end of said arc being longer than the other, the ends of the arc being disposed in different planes, means carried by said jaw structure adjacent said arc for biting engagement with the tooth surface, said means including divergently extending prongs, and means coacting with said element and said body for adjusting said slidable element to draw the loop into binding contact and said prongs into biting engagement with said tooth whereby a uniform binding pressure is maintained on the tooth by said loop and accidental displacement of said jaw structure is prevented during the clamping operation.

3. In a dental matrix clamp, a pair of complemental plates, one end of said plates constituting jaw portions, a slot open at its ends formed in said member, a member slidable between said plates, a loop member adapted to embrace a tooth, the free ends of the loop member extending through said slot and adjustably secured irrespective of their length to said slidable element, means in connection with said jaws adapted to bitingly engage the surface of the tooth, said means including pairs of prongs, the prongs of the respective pairs extending in divergent relation, and means for adjusting said slidable element to tighten the loop about said tooth and clampingly bring said prongs into biting engagement with said tooth.

4. A dental appliance including complemental plates formed at one end with jaws, the meeting faces of said plates being complementally formed to provide, when the faces are in meeting engagement, a slideway, spaced tooth elements carried by the respective jaws, a member slidably mounted in said slideway, a loop member adapted to embrace a tooth, said slidable element formed with a slot opening in one face terminating in an adjoining face, the free ends of said loop member adapted to extend through said openings, means for adjustably securing said ends therein irrespective of their length, means in connection with the respective jaws adapted to bitingly engage the surface of the tooth, and means for adjusting said slidable element to tighten said loop about the tooth and effect biting engagement of said jaws with said tooth.

5. A matrix clamp device comprising a pair of complemental plates with one end constituting jaws, an element slidable between said plates, a loop member carried by the slidable element and adapted to embrace a tooth, the jaws being formed with arcuate end surfaces, one end of the arcs being longer than the other ends to permit reversal to conform to different shaped teeth and to bitingly engage the tooth surface, and means for adjusting said slidable element to effect binding engagement of the loop and biting engagement of said jaws with respect to said tooth.

6. In a dental matrix clamp, a pair of complemental plates, one end of said plates constituting jaw portions, a member slidable between said plates, a loop member adapted to embrace a tooth, the free ends of the loop member being secured to said slidable element, said jaw portions having arcuate end surfaces, the ends of the arcs being disposed in vertically spaced planes, means carried by said jaws at the ends of said arcs for biting engagement with the tooth surface and resilient means for normally urging said slidable member in loop loosening direction and additional means for adjusting said slidable element to tighten said loop about the tooth and effect biting engagement of said jaws with the surface of said tooth.

7. In a dental matrix clamp a pair of complemental plates, one end of said plates constituting jaw portions, a member slidable between said plates, a loop member adapted to embrace a tooth, the free ends of the loop being secured to said slidable element, and means in connection with said jaws adapted to bitingly engage the surface of the tooth, means for adjusting said slidable element, said means including resilient means normally urging said loop in loosening direction, and means for moving said element in the opposite direction to tighten said loop and effect biting engagement of the jaws with the surface of said tooth, said jaws being formed to permit their reversal to conform to different shaped teeth.

8. A dental appliance including complemental plates formed at one end with jaw portions, a member having a slot extending therethrough and slidable between said plates, means interconnecting said plates to form a block-like structure, loop means adapted to embrace adjoining teeth, said loop means having overlapped ends adapted to extend through said slot irrespective of their length and being adjustably attached to said slidable member, spaced prong means in connection with the respective jaws, said respective prong means adapted to bitingly engage the surface of adjoining teeth, and means for adjusting said slidable element to tighten said loop means about said teeth and effect clamping engagement of said respective prongs with the adjoining teeth.

9. In a dental matrix clamp, a pair of complemental plates, one end of said plates constituting jaw portions, a member slidable between said plates, a loop member adapted to embrace a tooth, the free ends of the loop member being secured to said slidable element, said jaw portions having arcuate end surfaces, the ends of the arcs being disposed in vertically spaced planes, means carried by said jaws at the ends of said arcs for biting engagement with the tooth surface and additional means for adjusting said slidable element to tighten said loop about the tooth and effect biting engagement of said jaws with the surface of said tooth.

HORRIE BURTON STANFORD.